United States Patent
Eisner et al.

(10) Patent No.: US 10,259,330 B2
(45) Date of Patent: Apr. 16, 2019

(54) CHARGER PLUG FOR ELECTRIC VEHICLES

(71) Applicant: Charge-Amps AB, Stockholm (SE)

(72) Inventors: Charlotte Eisner, Stockholm (SE); Fredrik Jonsson, Stockholm (SE)

(73) Assignee: Charge-Amps AB, Stockholm (SE)

(*) Notice: Subject to any disclaimer, the term of this patent is extended or adjusted under 35 U.S.C. 154(b) by 129 days.

(21) Appl. No.: 15/079,350

(22) Filed: Mar. 24, 2016

(65) Prior Publication Data

US 2017/0274786 A1    Sep. 28, 2017

(51) Int. Cl.
  *B60L 11/18*    (2006.01)
(52) U.S. Cl.
  CPC ......... *B60L 11/1818* (2013.01); *B60L 11/185* (2013.01); *B60L 2230/10* (2013.01)
(58) Field of Classification Search
  CPC . B60L 11/1818; B60L 11/185; B60L 2230/10
  See application file for complete search history.

(56) References Cited

U.S. PATENT DOCUMENTS

| 8,075,329 | B1* | 12/2011 | Janarthanam | ....... B60L 11/1818 439/304 |
| 8,506,315 | B2* | 8/2013 | Canedo | .................. H01R 13/60 439/310 |
| 8,519,562 | B2* | 8/2013 | Gibbs | .................. G01R 31/045 307/9.1 |
| 8,712,648 | B2* | 4/2014 | Charnesky | ......... H01R 13/6272 439/304 |
| 9,035,606 | B2* | 5/2015 | Ross | ..................... H02J 7/0042 320/109 |
| 9,216,656 | B2* | 12/2015 | Nakajima | .......... H01R 13/6275 |

(Continued)

FOREIGN PATENT DOCUMENTS

DE    10 2014 102 197 A1    8/2015
JP        2014003005 A  *  1/2014

OTHER PUBLICATIONS

International Search Report for corresponding Patent Application No. PCT/SE2017/050282 dated Jun. 16, 2017.

*Primary Examiner* — Naum B Levin
(74) *Attorney, Agent, or Firm* — Renner, Otto, Boisselle & Sklar LLP

(57) ABSTRACT

An electric vehicle, EV, connector configured for charging an electric vehicle, EV, charging receptacle, said plug connector comprising:
a body having
a first plug end configured to be coupled to an EV charging receptacle on an electric vehicle for charging or recharging;
a second power cable end configured to be coupled to a power cable, wherein the first end includes a terminal interface having one or more terminal receptacles for receiving one or more terminals positioned within the EV charging receptacle,
and wherein the first end also includes a latching member positioned generally above the terminal interface, and is hingedly coupled to a part of the body to allow the latching member to move along a vertical access for coupling or decoupling the EV connector to the EV charging receptacle, and wherein the latching member is controlled by an electro mechanical manipulator provided inside the body, and arranged to control and allow the latching member to move along the vertical access.

8 Claims, 2 Drawing Sheets

(56) References Cited

U.S. PATENT DOCUMENTS

| | | | | |
|---|---|---|---|---|
| 9,457,675 B2* | 10/2016 | Fukai | ............ | H01R 13/639 |
| 9,614,328 B2* | 4/2017 | Feldner | ............ | H01R 13/639 |
| 9,871,379 B2* | 1/2018 | Cheng | ............ | H02J 3/383 |
| 2010/0306033 A1* | 12/2010 | Oved | ............ | G06Q 10/06375 |
| | | | | 705/7.37 |
| 2013/0134938 A1* | 5/2013 | Bianco | ............ | H02J 7/00 |
| | | | | 320/109 |
| 2014/0002018 A1 | 1/2014 | Montemayor et al. | | |
| 2015/0372421 A1* | 12/2015 | Feldner | ............ | H01R 13/6397 |
| | | | | 439/345 |
| 2016/0372862 A1* | 12/2016 | Kim | ............ | H01R 13/447 |
| 2017/0025789 A1* | 1/2017 | Takagi | ............ | B60L 11/1818 |
| 2017/0047679 A1 | 2/2017 | Garth | | |
| 2017/0166070 A1* | 6/2017 | Dunger | ............ | B60L 11/1818 |
| 2017/0297442 A1* | 10/2017 | Eisner | ............ | B60L 11/1818 |

\* cited by examiner

CHARGER PLUG FOR ELECTRIC VEHICLES

TECHNICAL FIELD

The present disclosure relates generally to the field of electric vehicle recharging. More specifically, the present disclosure relates to apparatuses for electric vehicle charging and recharging.

BACKGROUND

Electric and so-called "hybrid-electric" vehicles store electrical power in an electric power storage, such as a battery. The electric power is used by the vehicle to be converted into useful work, such as by powering electric motors that are connected to the vehicle's wheels. In these hybrid-electric vehicles, a combustion engine, such as a petrol or diesel engine rotates an electric generator that produces electric power, is stored in a battery for powering one or more electric motor(s). The electric power in electric and hybrid-electric vehicles may also be generated using other means such as regenerative braking, which converts the energy dissipated during the braking and slowing down of the vehicle into electric energy for example.

The electric vehicle (EV), which lacks an independently fueled engine, relies on an external power source to provide the energy stored in the battery. The electric vehicle therefore includes a charging plug receptacle that allows a vehicle operator to couple the vehicle to a utility-grid connected electric circuit. Electrical power is transferred from the utility-grid connected electric circuit to the vehicle for charging or recharging the batteries. A third type of vehicle, a so-called plug-in hybrid electric ("PHEV") includes an engine for generating power during operation, but also incorporates a charging plug receptacle to allow recharging the battery when the vehicle is not in use.

In an effort to promote standardization and interoperability, different standards have been proposed, such as the American J1772 standard promoted by the Society of Automotive Engineers (SAE) for example, that establish defined charging plug receptacle and plug parameters and protocols for enabling charging. The J1772 standard provides three different levels of charging. Typically, the charging level depends on the capability of the vehicle to receive electric power and the ability of the utility-grid connected electrical circuit to deliver the power.

Level 1 charging allows the vehicle to receive electric power from a 110 volt, 15-ampere circuit, such as that typically found in a common residential circuit. Level 1 charging provides an advantage in allowing the operator to connect in many locations using standard circuits, such as those commonly found in a residential garage. However, due to the low power capacity of these electrical circuits, an electric vehicle requires 24-26 hours to fully charge.

Level 2 charging allows the vehicle to receive electrical power from a 220V, 30 ampere circuit for example. The Level 2 charging will typically recharge a vehicle battery in three to six hours. These 220V circuits are found in some residences and may be used for certain existing appliances, such as a clothes dryer for example.

Level 3 charging, provides for charging the vehicle using a 440V circuit. The charging of the vehicle on a Level 3 circuit typically allows the charging of the vehicle battery in two to three hours.

SUMMARY OF THE DISCLOSURE

According to one aspect of the present disclosure, there is provided an EV connector. The EV connector can be configured in such a way as to comply with the SAE J 1772 standard, according to the Level 1, Level 2 and Level 3 charging, but is not limited thereto. The EV connector can alternatively without any limitation be adapted to any standard including European and Japanese standards using other voltage levels. The EV connector has an electro-mechanical locking member.

According to another aspect of the present disclosure, an EV connector can also include a power cable. The EV connector and cable can be configured in such a way as to comply with the SAE J1772 standard, but is not limited thereto.

According to one embodiment of the present disclosure, there is provided an EV connector configured for charging an electric vehicle via a charging plug receptacle. The connector comprises a body having a first plug end configured to be coupled to an EV charging receptacle on an electric vehicle for charging or recharging; a second power cable end configured to be coupled to a power cable. The first plug end includes a terminal interface having one or more terminal receptacles for receiving one or more terminals positioned within the EV charging receptacle. The first plug end also includes a latching member positioned generally above the terminal interface, and is hingedly coupled a part of the body to allow the latching member to move along a vertical access for coupling or decoupling the EV connector to the EV charging receptacle, and wherein the latching member is controlled by an electro mechanical manipulator provided inside the body, and arranged to control and allow the latching member to move along the vertical access.

According to various embodiments of the present invention, the latching member can be configured such as a locking hook complying with US type-1 standard for charging plugs and receptacles.

According to another embodiment of the present disclosure, there is provided an EV connector according to the first aspect of the present invention, further comprising a power cable comprising a first end and a distal second end, the first end of the power cable coupled to the cable end of the EV plug connector, the distal end arranged to be coupled to and receive power from a power source, such as a power grid.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description in conjunction with the accompanying figures in which.

Figure 1:
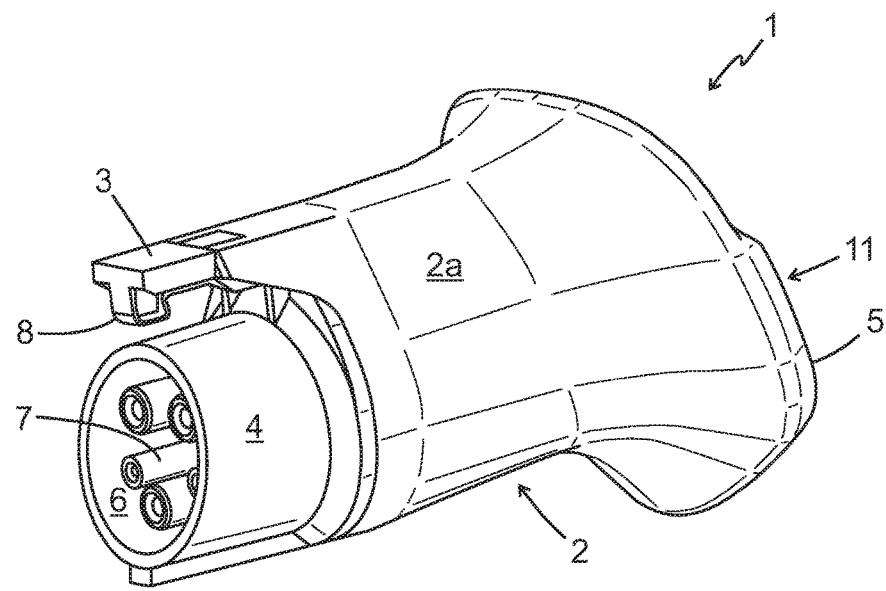
FIG. 1 is a perspective view of an EV connector in accordance with an embodiment of the present disclosure.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements throughout the several views.

DESCRIPTION OF EMBODIMENTS

The present disclosure is directed to an EV connector and an EV connector coupled to and comprising a power cable, respectively. In particular, according to a non-limiting embodiment, the disclosure is directed to an EV connector and a connector comprising a power cable, respectively, that is capable of being permanently coupled to standard 440 V, 110V and 220V vehicle charging stands, or into standard 440V, 220V and 110V electric sockets, by means of a plug to receive power from a source of electricity such as a power grid. Although the description of embodiments is provided below in conjunction with a particular type of EV connector and EV charging plug receptacle, alternate embodiments of the invention may be applicable to other types and configurations of EV connectors and EV charging plug receptacles.

Herein, the term "EV connector" includes also the term "EV plug". The EV connector is configured to receive power from any suitable source of electricity capable of charging and recharging an electric vehicle. Thus, the term "connector" can also sometimes be referred to as a "plug".

The invention may be better understood by reading the following description of non-limiting, exemplary embodiments with reference to the attached drawings, wherein like parts of each of the figures are identified by like reference characters, and which are briefly described as follows.

Now is referred to FIG. 1 illustrating a perspective view of an EV connector in accordance with one non-limiting embodiment of the present disclosure.

The EV connector 1 comprises a body 2 having a hollow housing 2a that can be made of plastic or other non-conductive materials, but can also be made of metal. The EV connector 1 may also include a handle (not illustrated), which may also be hollow as the body 2. In the embodiment illustrated in FIG. 1, the body 2 and the handle are integrally formed. The body 2, and/or alternatively, the handle (if any) can also include multiple raised sections separated by flat or gently curving sections to provide a form-fitting feel when the fingers of a hand grasp the body and/or the handle (if any).

Figure 3:
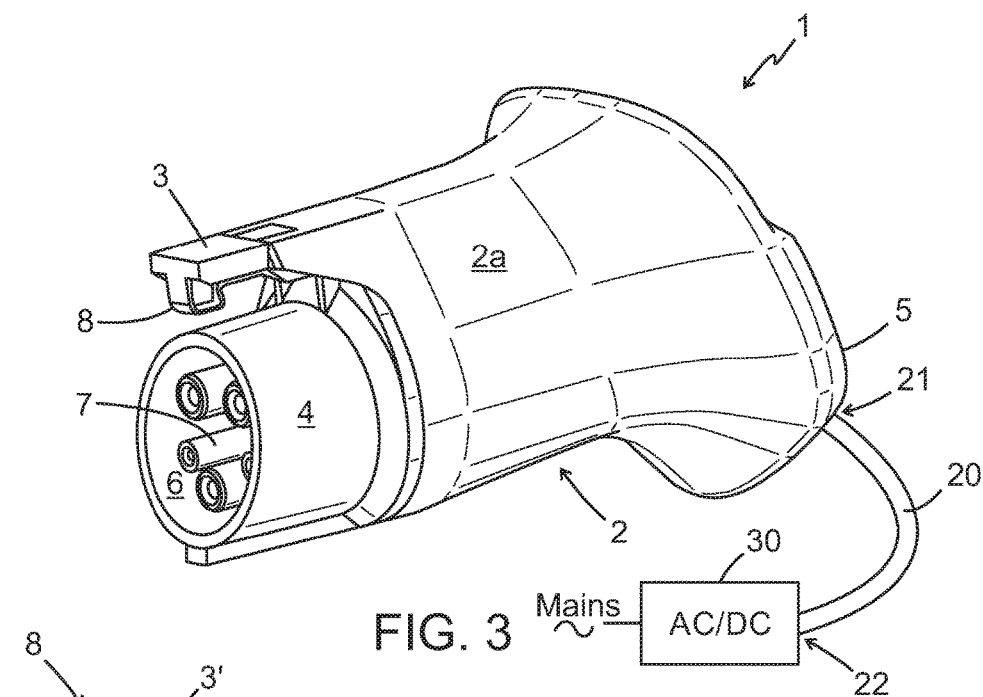
FIG. 3 illustrates an EV connector coupled to a power cable comprising a first end and a distal second end, the first end of the power cable coupled to the EV connector according to another embodiment of the present disclosure, the distal end coupled to a source of electricity, herein a power grid via an electric vehicle charging circuit.

The body 2 has a first plug end 4 configured to be plugged into and coupled to a conventional EV charging plug receptacle on an electric vehicle for charging and/or recharging and has a second power cable end 5 configured to be, typically permanently, but not limited thereto, coupled to a power cable (illustrated in FIG. 3 only). The first plug end 4 includes a terminal interface 6. In one embodiment, the terminal interface 6 includes one or more terminal receptacles 7 for receiving one or more terminals positioned within the EV charging receptacle of the electric vehicle. The interface can be provided as a so-called "type-1" interface, complying with US-standard type-1, but is by no means limited to this.

The first plug end 4 also includes a latching member 8 positioned generally above the terminal interface 6, and is hingedly coupled to a part of the body 2 to allow the latching member 8 to move along a vertical access for coupling or decoupling the EV connector 1 to the EV charging receptacle of the electric vehicle. The latching member 8 is held in position by means of the housing 2a.

Typically, the latching member 8 is sized and shaped to be slidably inserted into a conventional latching chamber of the EV charging plug receptacle of the electric vehicle. The latching member 8 is configured to secure the EV connector 1 to the EV plug receptacle on a vehicle. In certain exemplary embodiments, sensors or contacts may be electrically or communicably coupled to the latching member 8 to determine when the latching member 8 is engaged with or attached to the latching chamber of the vehicle and the EV connector 1 is being securely held in place within the EV charging receptacle of the vehicle. In these exemplary embodiments, a controller, typically provided inside the body 2, may prevent electricity from flowing through the connector 1 and EV receptacle and into the electric vehicle until a secure latching between the latching member 8 and the latching chamber of the electric vehicle is determined or sensed.

Figure 2A:
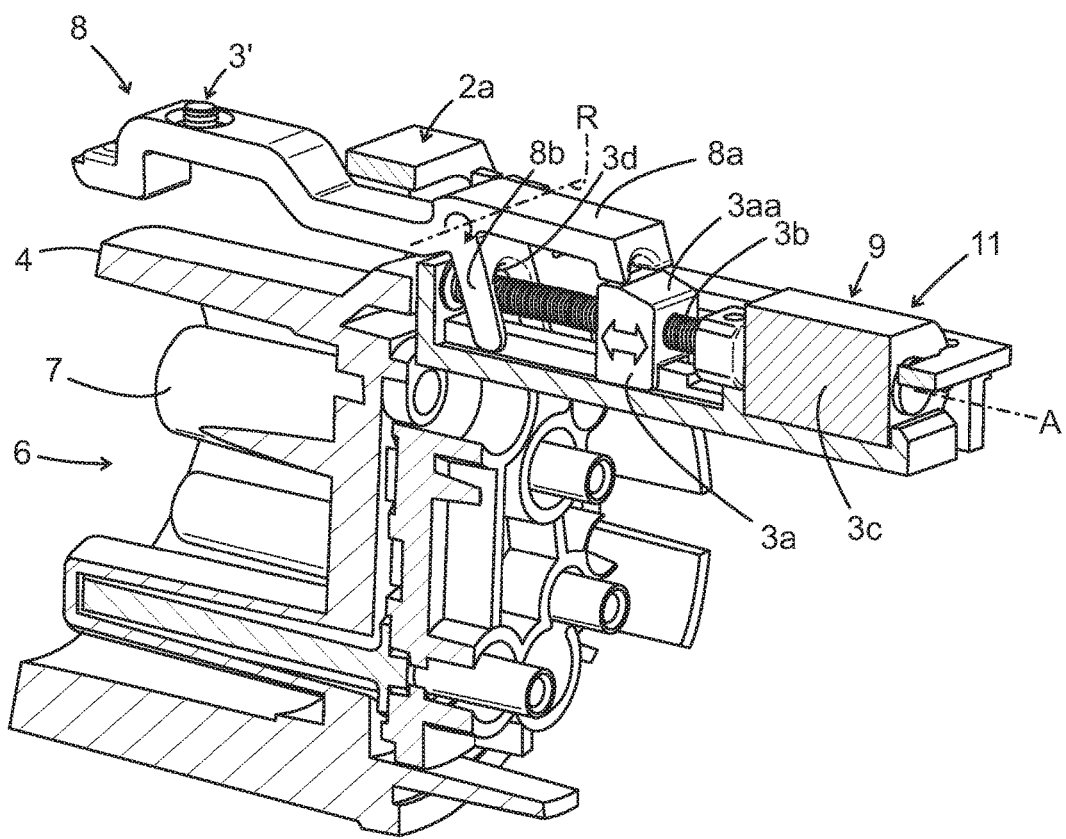
FIG. 2a is a sectional exaggerated view of the EV connector of FIG. 1
Figure 2B:
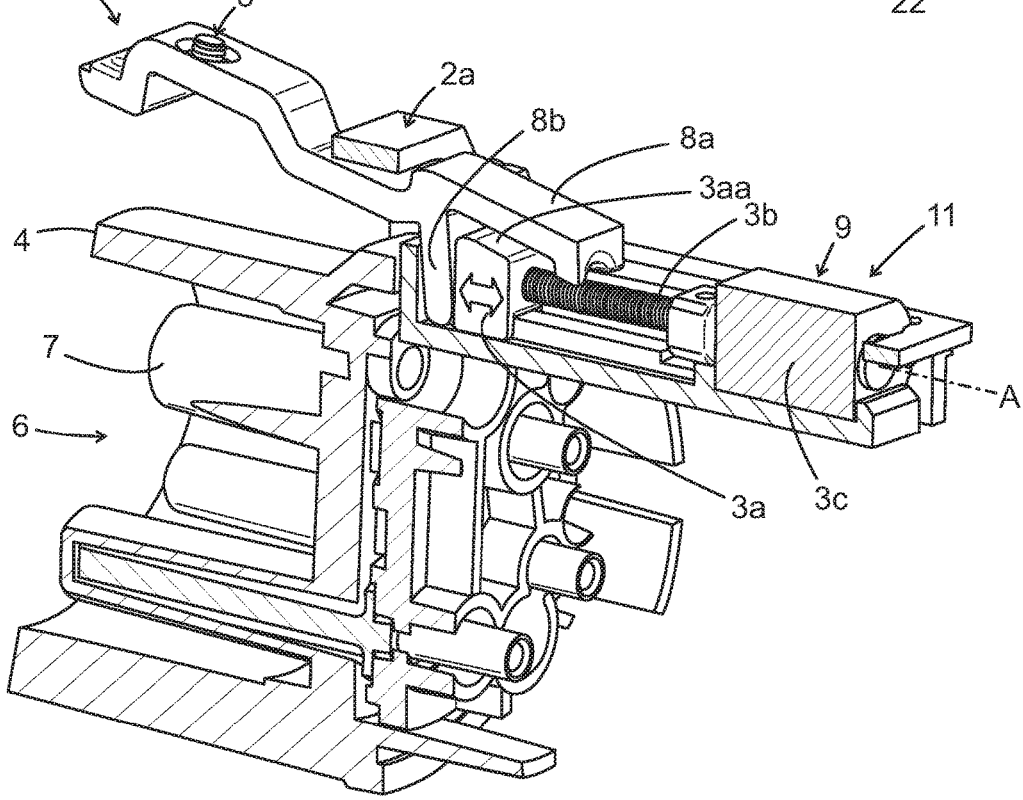
FIG. 2b is a sectional exaggerated view of the EV connector of FIG. 1 in an unlocked position.

In certain embodiments, the latching member 8 may also include a cover member 3 attached to the latching member 8. The cover member may cover a portion of the latching member 8 and be attached by fastening means 3', such as a screw (as illustrated in FIGS. 2a and 2b), for instance to protect the latching member 8 from damage. In certain embodiments, also the housing 2a can comprise and be integrally formed with another cover member (not illustrated).

Now is referred to FIG. 2a, which is a sectional exaggerated view of the EV connector 1 of FIG. 1 without the housing 2a, but only a small part thereof shown schematically.

The latching member 8 is held in position by means of the housing 2a, of which only a small part thereof is shown schematically. The latching member 8 is controlled by an electro-mechanical manipulator 9 provided inside the body 2. The electro-mechanical manipulator 9 typically comprises a locking member 3a, which is slidable in two directions (see double-head arrow) and is concentrically arranged, typically, but not limited thereto, by means of windings, (not shown) around a typically threaded, but not limited thereto, actuator rod 3b, along a longitudinal axis A of the latching member 8. The electro-mechanical manipulator 9 has an electro-mechanical actuator 3c configured in-line, and arranged to control and allow the latching member 8 to rotate around the rotational axis R and thereby in the plug end 4 causing the latching member 8 to move along the vertical access.

By operating on a rear-part 8a of the latching member 8, the latching member 8 can be locked and unlocked depending on the position of the slidable locking member 3a. In a locked position, the rear-part 8a as illustrated in FIG. 2a, in a locked position, i.e. locked to the vehicle, rests on an upper part 3aa of the slidable locking member 3a. The flat surface of the upper part 3aa onto which the rear part 8a of the latching member 8 rests (in locked position) then hinders the latching member 8 to rotate and move along the vertical access.

The rear part 8a of the latching member 8 can be forced upwards by means of a resilient means such as a coil spring 8d (only shown schematically in FIG. 2a) provided between the rear part 8a of the latching member 8 and the housing 2a.

The exemplary EV connector 1 also includes an actuator button 11 (schematically illustrated only), which can be provided on an exterior of the body 2 and electrically coupled to the latching member 8. As examples, but not limited thereto, the actuator button 11, is typically provided on a rear part of the housing 2a and embodied as one or more touch sensitive sensor(s). The actuator button 11 may alternatively be embodied as another button, touch sensor or by other means for instance via a smart-phone on site, or via a cellular network from a remote location. In certain exemplary embodiments, the actuator button 11, when manipulated, typically depressed by an operator such as a vehicle driver, actuates the electro-mechanical actuator 3b which actuates the locking member 3a (herein also having an inclined upper surface 3aa onto which the rear part 8a of the latching member 8 rests), to move left-wards (as illustrated in FIG. 2b) and thereby press on a lever 8b arranged inclined to the rear part 8a of the latching member 8, which lever 8b actuates the latching member 8 to pivot around the rotational axis R causing the latching member 8 to move along the vertical direction to unlock and to disengage the latching member 8 from the latching chamber of the vehicle. The actuator button 11 may in alternative embodiments be provided in different various modifications. This is a great advantage to users who find it difficult to disengage the connector from the vehicle after having charged the electric vehicle.

Alternatively or in addition to that described above, activation of the actuator button 11 can also electro-mechanically engage or couple the latching member 8 to the latching chamber. The latching member's rear-part 8a then pivots in the opposite direction as described above. This can be an advantage to users who find it difficult to engage the connector to the vehicle for charging the electric vehicle.

This is a great advantage compared to prior art all-mechanical latching members, which may often be troublesome to manipulate for many users.

In certain embodiments, the latching member 8, which is hingedly coupled, comprises as top which stops the latching member 8 to pivot more than required. When a user presses the actuator button 11, the lever pivots, thereby causing the latching member 8 to pivot, for example vertically, to enable the user to disengage the EV connector 1 from the EV plug receptacle.

The invention is by no means limited to the above described embodiments, but the electro mechanical manipulator can be alternatively embodied.

Electric power is provided by a power source which may include any suitable type of AC and/or DC power source. The electric power flows from the power source to electric components in an EV charger, via an electrical cable to the EV connector and to the vehicle. The EV charger comprises electrical components for receiving electric power from a power source, such as an electric grid through a standard wall mounted electrical receptacle, and providing that electric power to an electric vehicle, through the EV connector 1.

Now is referred to FIG. 3.

FIG. 3 illustrates an EV connector 1 coupled to a power cable 20 comprising a first end 21 and a second distal end 22, the first end 21 of the power cable 20 coupled to the EV connector 1 according to another embodiment of the present disclosure, the second distal end 22 coupled to a power source 30, herein an EV charger 30 receiving power from a power grid according to certain exemplary embodiments. In certain exemplary embodiments, the EV connector 1 is directly coupled to the EV charger, wherein the power cable 20 electrically and mechanically couples the EV charger 30 to the EV connector 1. Alternatively, other devices and systems for connecting one device to another can be used. The EV charger 30 may include components such as: circuit boards, transformers, modules, lights, displays, charging circuits and/or any other components to implement an electric vehicle supply circuit such as a circuit for charging an electric vehicle with the EV connector 1. The electric components within the EV charger 30 can also include, but are not limited to, a ground fault circuit interrupter sensor, and a current sensor. All components may be reordered and/or rearranged in any suitable manner, for instance partly inside the body 2 of the EV connector 1. The EV charger 30 provides electricity to an electric vehicle through an electric power cable and an EV connector 1 that plugs into a corresponding charging receptacle on the electric vehicle.

In addition or alternatively, the EV connector 1 may also include circuit boards, transformers, modules, lights, displays, charging circuits and/or any other components to implement an electric vehicle supply circuit such as a circuit for charging or recharging an electric vehicle with the EV connector 1. For example, one embodiment may include circuitry to implement an AC Level 1 charging device that operates from 120 VAC power and includes one or more indicator lights on the EV charger 30 to indicate the status of the power source, vehicle charge state, fault conditions, etc. As another example, a different embodiment of the EV charger 30 may include circuitry to implement an AC Level 2 charging device that operates from a dedicated source of 240 VAC power and includes an alphanumeric display with keypad and/or network capabilities (not shown). As a further example, in another embodiment the EV charger 30 may include a charging circuit with an AC/DC converter to implement a DC charging device.

The exemplary EV charger 30 houses electrical components for receiving electrical power from a power source such as an electrical grid through a standard wall mounted electrical receptacle and providing that electrical power to an electric vehicle, through the EV connector 1.

The EV charger 30 typically also includes one or more visual indicators. The visual indicators can be lights. For example, the visual indicators can include light emitting diodes or other light sources. In this example, the visual indicators can further include an opaque, transparent or partially transparent lens or cover over all or each of the visual indicators. The lens or cover can further be tinted a desired color, such as blue, etc. to help further convey the information provided by the visual indicator. The visual indicators include, but are not limited to, a charging indicator, a ready indicator, and a finished indicator. The EV charger 30 may be the applicant's sold under the trade mark Halo Wallbox™.

Typically, the charging indicator provides a visual indication that the EV connector 1 is connected to the EV charging receptacle of the vehicle and is currently charging the batteries of the electric vehicle. Typically, the ready indicator provides a visual indication that the EV connector 1 is receiving electrical power and is ready to be coupled to the EV charging receptacle to provide electric power to the batteries of the electric vehicle. Typically, the finished indicator provides a visual indication that the charging sequence has been completed.

Typically, the electric vehicle charger stand includes a housing or stand that is mounted to the ground or some other surface. The EV charger is typically hard-wired to an electrical grid, or detachably connected via a plug to a socket, to receive a source of electricity to be provided to the electric vehicle.

Although each embodiment has been described in detail, it is to be construed that any features and modifications that are applicable to one embodiment are also applicable to the other embodiments. Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

The invention claimed is:

1. A plug connector configured for charging an electric vehicle, EV, charging receptacle, said plug connector comprising:
    a body having a hollow housing and having a first plug end configured to be coupled to an EV charging receptacle on an electric vehicle for charging or recharging;
    a second power cable end configured to be coupled to a power cable, wherein
    the first plug end includes a terminal interface having one or more terminal receptacles for receiving one or more terminals positioned within the EV charging receptacle, and
    wherein the first plug end also includes a latching member configured to secure the plug connector to the charging receptacle on a vehicle, the latching member being positioned generally above the terminal interface, and the latching member hingedly coupled to a part of the body to allow the latching member to move along a vertical access for coupling or decoupling the plug connector to the EV charging receptacle, and wherein the latching member is controlled by an electro mechanical manipulator provided inside the hollow housing, the electro mechanical manipulator arranged to effect movement of the latching member along the vertical access between a locked position for securing the plug connector to the charging receptacle and an unlocked position for releasing the plug connector from the charging receptacle.

2. The plug connector of claim 1, further comprising a power cable comprising a first end and a distal second end, the first end of the power cable coupled to the second power cable end, the distal end arranged to be coupled to and receive power from a power grid.

3. The plug connector of claim 2, wherein the plug connector is configured to be coupled to a power grid.

4. The plug connector of claim 3, wherein the EV connector is configured to be coupled to a 110 VAC power grid.

5. The plug connector of claim 3, wherein the EV connector is configured to be coupled to a 220 VAC power grid.

6. The plug connector of claim 3, wherein the EV connector is configured to be coupled to a 440 VAC power grid.

7. The plug connector of claim 1, wherein the latching member is configured as a locking hook complying with SAE J1772 standard for charging plugs and receptacles.

8. The plug connector of claim 1, wherein the latching member is provided as a locking hook complying with US type-1 standard.

* * * * *